United States Patent
Dutta et al.

(10) Patent No.: US 6,546,423 B1
(45) Date of Patent: Apr. 8, 2003

(54) SYSTEM AND METHOD FOR NETWORK LOAD BALANCING

(75) Inventors: Partha P. Dutta, San Jose, CA (US); Nino Vidovic, Santa Clara, CA (US); Dalibor F. Vrsalovic, Sunnyvale, CA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/422,950

(22) Filed: Oct. 22, 1999

Related U.S. Application Data

(60) Provisional application No. 60/105,192, filed on Oct. 22, 1998.

(51) Int. Cl.[7] ............................................. G06F 15/173
(52) U.S. Cl. ................... 709/225; 709/224; 709/226; 709/227; 709/235; 709/229; 713/152; 713/153; 713/154; 713/200; 713/201
(58) Field of Search ................... 709/201–203, 709/234–236, 224–227, 105, 217–219, 229; 713/151–154, 200–201

(56) References Cited

U.S. PATENT DOCUMENTS 5,996,077 A * 11/1999 Williams .................... 713/201
6,088,796 A * 7/2000 Cianfroccca ................ 713/152
6,141,749 A * 10/2000 Coss et al. .................. 713/163
6,154,775 A * 11/2000 Coss et al. .................. 709/225
6,330,602 B1 * 12/2001 Law et al. ................... 709/224
6,170,012 B1 * 1/2002 Coss et al. .................. 709/225

FOREIGN PATENT DOCUMENTS

| EP | 0 762 707 A2 | 8/1997 |
| WO | 96/05549 | 2/1996 |

OTHER PUBLICATIONS

Bellovin, S.M., "Network Firewalls", IEEE Communications Magazine, vol. 32, No. 9, Sep. 1, 1994, p. 50–57, XP000476555; p. 52, col. 1, ln. 60; pp. 54, col. 2, ln 30.

* cited by examiner

Primary Examiner—Glenton B. Burgess
Assistant Examiner—Hieu C. Le
(74) Attorney, Agent, or Firm—Ahsan & Associates; Aziz M. Ahsan; Michelle Conover

(57) ABSTRACT

A system and method for load balancing. A packet is received at a firewall, which implements a rule and refers the packet to a load balancing proxy. The proxy performs a load balancing analysis at the load balancing proxy. Based on the results of the load balancing analysis, the proxy determines a load balancing rule, which is implemented by the firewall. At the end of the session to which the received packet belongs, the load balancing rule is deleted at the firewall.

10 Claims, 3 Drawing Sheets

SYSTEM AND METHOD FOR NETWORK LOAD BALANCING

CROSS REFERENCE TO RELATED APPLICATIONS

This application claims priority to provisional application 60/105,192 entitled "SYSTEM AND METHOD FOR NETWORK LOAD BALANCING," filed Oct. 22, 1998, the contents of which are incorporated herein by reference.

FIELD OF THE INVENTION

The field of the invention is load balancing, and in particular using a firewall to perform load balancing.

BACKGROUND OF THE INVENTION

A known load balancer is configured as a proxy server that receives a packet of information, performs some analysis on the packet to select a destination server, and then forwards the packet to the selected server. However, in order to perform load balancing on a packet, the packet must be addressed by its sender to the balancer, not to the packet's actual intended destination. This disadvantageously adds an additional layer of complexity in the addressing scheme for the sender to obtain service from the destination server. Further, a known balancer performs substantial analysis of each packet, which absorbs processor resources of the balancer, adds a delay to the delivery of the packet to its actual intended destination, and increases the chances that a packet will be erroneously dropped.

A firewall regulates the flow of packetized information. A packet includes a header and a payload. The header includes header information (header parameters), which can include a source and destination address for the packet, as well as source and destination port numbers, a protocol number, a physical location identifier, flags, a priority indicator (ROUTINE, URGENT, etc.), security information, etc. The payload includes the data meant to be conveyed by the packet from its source to its intended destination. A known firewall is placed between the packet's source and intended destination, where it intercepts the packet. A known firewall filters a packet based upon the packet's header parameters and a rule loaded into the firewall. The rule correlates a pattern in the header of a packet with a prescribed action, either PASS or DROP. The filter identifies the rule that applies to the packet based upon the packet's header, and then implements the rule's prescribed action. When a DROP action is performed, the packet is blocked (deleted), and does not reach its intended destination. When a PASS action is performed, the packet is passed on toward its intended destination. The set of rules loaded into a firewall reflect a security policy, which prescribes what type of information is permissible to pass through the firewall, e.g., from which source, to which destination, for which applications, etc.

The analysis performed by a firewall in deciding what action to perform with respect to a packet is much less extensive than the analysis performed by a known load balancer in deciding where to route a packet. Therefore, a firewall action on a packet can be performed more quickly and with less burden on a processor than can a known load balancer. Also, a packet need not be addressed to a firewall in order to be acted on by the firewall, unlike a known load balancer. Thus, a firewall advantageously acts on a packet transparently, i.e., without requiring any special action on the part of the packet's sender.

SUMMARY OF THE INVENTION

In accordance with an embodiment of the present invention, a packet is received at a firewall, which implements a rule and refers the packet to a load balancing proxy. The proxy performs a load balancing analysis at the load balancing proxy. Based on the results of the load balancing analysis, the proxy determines a load balancing rule, which is implemented by the firewall. At the end of the session to which the received packet belongs, the load balancing rule is deleted at the firewall.

The present invention provides at least two advantages over the prior art. Load balancing using a firewall is transparent to the sender compared with known load balancers, which are not transparent. The sender can advantageously address its packets to their intended destination, and need not specially address the packet to an intermediary, as with a load balancer. Also, the routing performed by a firewall implementing a rule is much quicker and more efficient than the routing performed by a load balancer.

DETAILED DESCRIPTION

Figure 1:
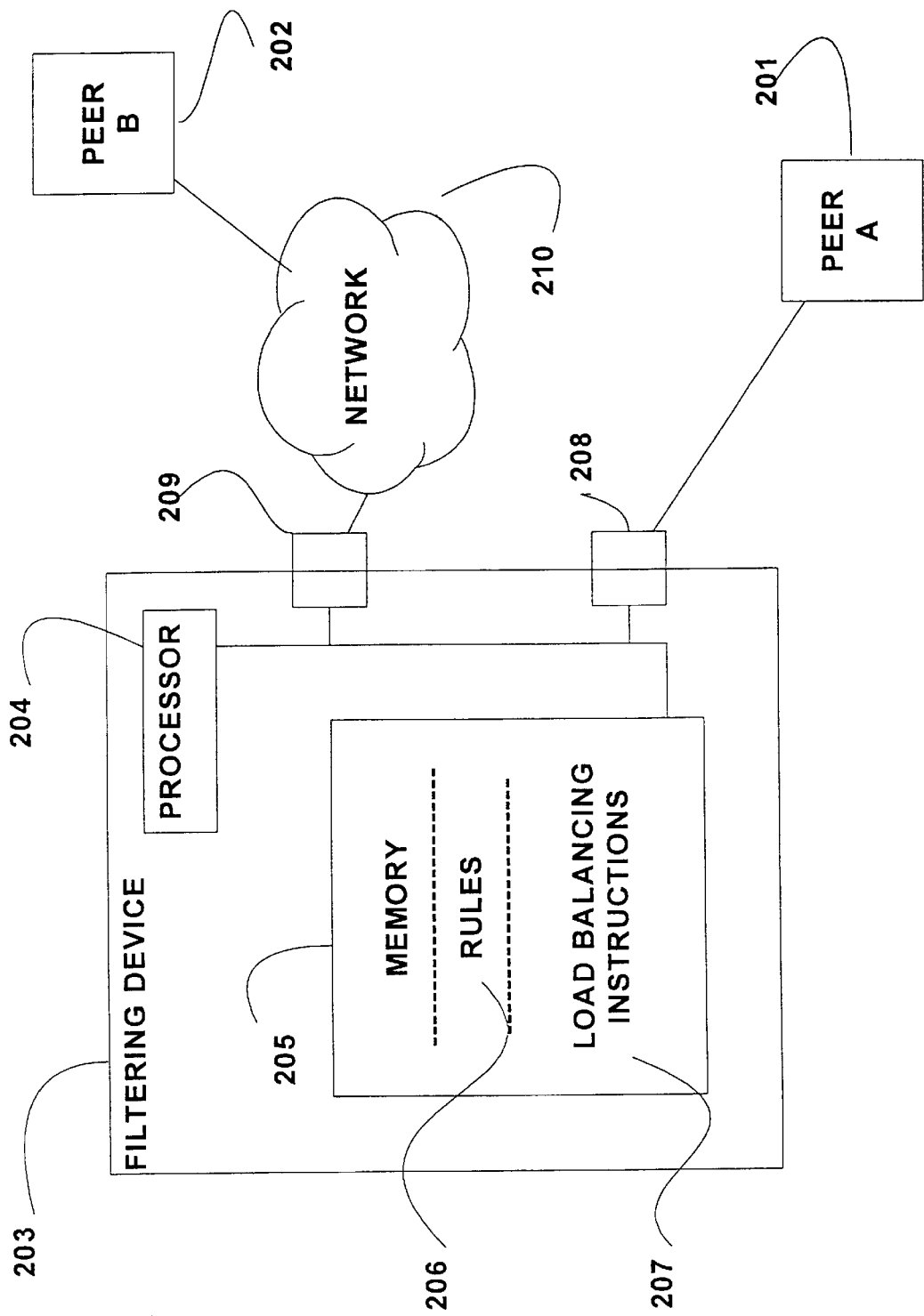
FIG. 1 shows an apparatus in accordance with an embodiment of the present invention.

An apparatus in accordance with an embodiment of the present invention is shown in FIG. 1. Peer A 201 (the sender) sends a packet of information addressed to destination Peer B 202 (the destination) through filtering device 203. Filtering device 203 comprises a processor 204, a memory 205 that stores firewall rules 206 and load balancing instructions 207 adapted to be executed by processor 204 to perform steps of the method in accordance with an embodiment of the present invention, i.e., receive a packet, implement a rule that refers the packet to a load balancing proxy, perform a load balancing analysis at the load balancing proxy, determine a load balancing rule based on the results of the load balancing analysis, and implement the load balancing rule at the firewall.

In one embodiment of the present invention, a load balancing rule is determined from a predetermined set of load balancing rules stored at memory 205. In one embodiment, that part of memory 205 that stores the set of load balancing rules is located at the same site as processor 204. In another embodiment, that part of memory 205 that stores a set of load balancing rules is located at another site than processor 204, e.g., at an external database. In one embodiment, sets of load balancing rules are stored at several locations in a distributed fashion. In one embodiment, a load balancing rule is dynamically constructed by a load balancing proxy, base upon the results of a load balancing analysis. As used herein, "determining" a load balancing rule is meant to include the process of dynamically constructing such a load balancing rule.

In one embodiment, the load balancing instructions include firewall instructions ("firewall" when being executed by a processor 204) and load balancing proxy instructions ("load balancing proxy" when being executed by a processor). The firewall performs firewall functions, which include receiving a packet, implementing a rule and referring the packet to the load balancing proxy, and implementing a load balancing rule. The load balancing proxy performs proxy functions, including performing a load balancing analysis and determining a load balancing rule based on that analysis.

The filtering device 203 also includes a first port 208 through which the packet is received from Peer A 201, and a second port 209 through which the packet will pass to Peer B 202 through network 210 if the pertinent rule prescribes a PASS action with respect to the packet. Ports 209 and 210, memory 205 and processor 204 are coupled. The term "coupled" is intended to encompass and be broader than the term "directly connected." If A is directly connected to B, and B is directly connected to C, then A is said to be "coupled" to C. In other words the term coupled includes the term "indirectly connected."

Peers 201 and 202 are each a computer with a permanent or temporary network address. Network 210 is any information systems network across which the information in the packet can be sent. Examples of network 210 include the Internet, an intranet, a virtual private network, etc.

In one embodiment, processor 204 is a general purpose microprocessor, such as the Pentium II microprocess or manufactured by the Intel Corporation of Santa Clara, Calif. In another embodiment, processor 204 is an Application Specific Integrated Circuit (ASIC), which has been specifically designed to perform at least some of the steps of the method in accordance with an embodiment of the present invention. ASICs are well-known in the art for application such as digital signal processing. In an embodiment of the present invention that includes an ASIC, at least part of the rule instructions 207 can be implemented in the design of the ASIC.

Memory 205 can be Random Access Memory (RAM), a hard disk, a floppy disk, an optical digital storage medium, or any combination thereof. Memory 205 is meant to encompass any means for storing digital information, although at least part of the memory 205 should be writable. The present invention encompasses memory 205 structures that are distributed, i.e., the rules and instructions stored in memory 205 may be stored in separate structures that are accessible to the processor 204, for example, through a network. For example, in one embodiment, rules 206 are stored on a hard disk on a server coupled through a network to the processor 204, while the load balancing instructions 207 are stored in RAM coupled to the processor through a bus, the RAM, processor 204 and bus being co-located as parts of the same computer.

The processors and memory are coupled to ports through which a packet can be received and/or sent. In one embodiment of the present invention, the firewall functions (receiving a packet, implementing a rule and referring a packet to a load balancing proxy, and implementing a load balancing rule) are implemented as a part of the kernel, i.e., at a relatively low level at which operating system processes are executed. Thus implemented, the firewall functions take advantage of the kernel's protected memory, rendering the firewall functions robust and less vulnerable in the event of a system failure. In the kernel's protected memory, the firewall functions are protected from user applications that are being executed. The load balancing proxy instructions are executed at the application level, i.e., the level at which software applications (e.g., a word processor, a spreadsheet, etc.) are executed.

Ports 208 and 209 shown in FIG. 1 only illustrate one embodiment of the present invention. In the embodiment shown in FIG. 1, port 208 is dedicated to communication with peer A 201 while port 209 is dedicated to communication with peer B 202 through network 210. In one embodiment, there are a plurality of ports to and from numerous destinations. The port configuration is expected to vary to suit the particular connectivity required of a filtering device 203 in a given situation, i.e., in a given context or architecture in which parties communicate through filtering device 203. An embodiment of the present invention is advantageously scalable, in part because in one embodiment, the load balancing rule only determined and implemented only for a single session. A session is defined herein to be "an active communications connection, measured from beginning to end, between computers or applications over a network." See Newton's Telecom Dictionary, $15^{th}$ Ed., by Harry Newton, 1999, page 706. In one embodiment, the load balancing rule is deleted at the firewall when the session is terminated.

Figure 2:
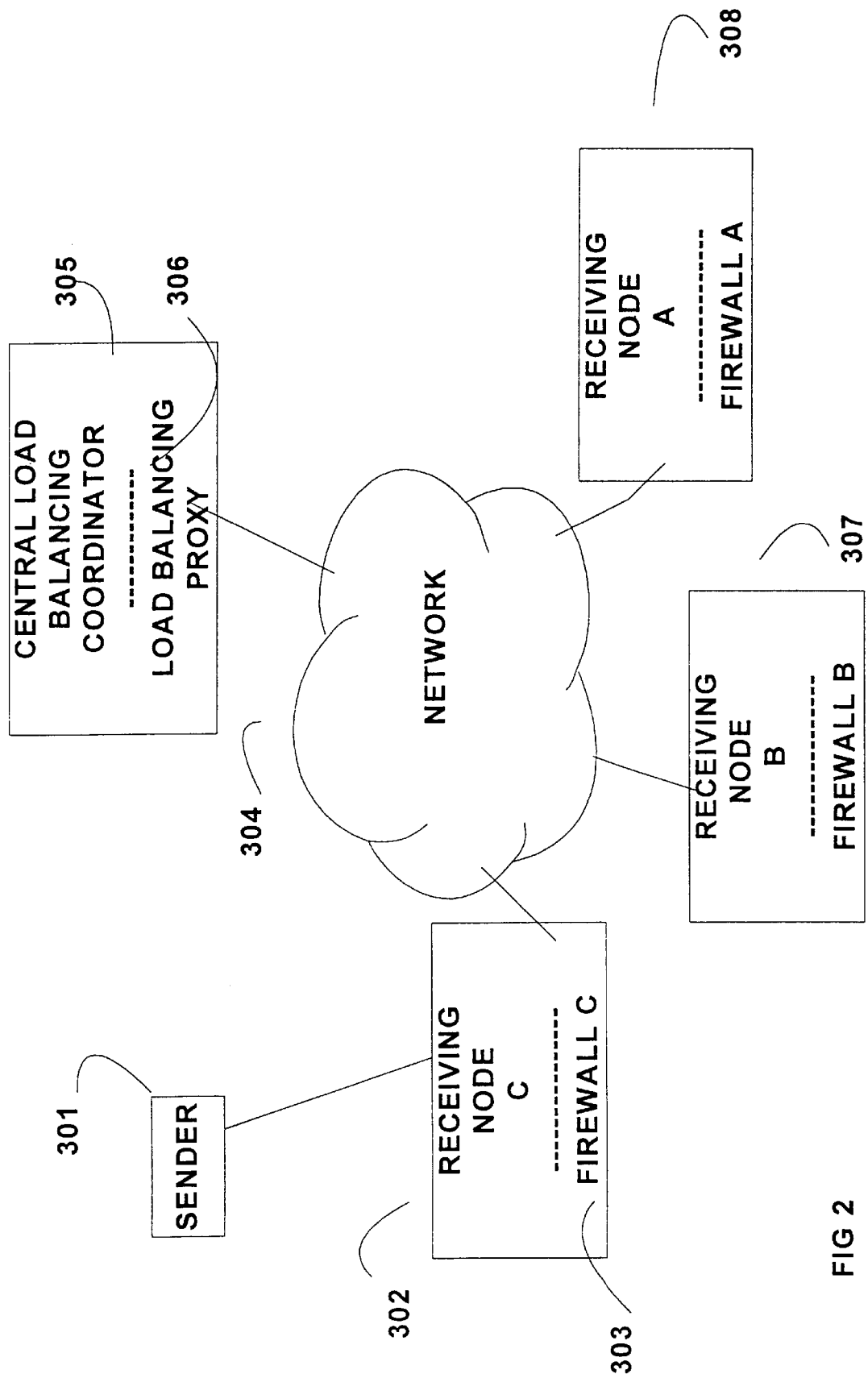
FIG. 2 shows a system in accordance with an embodiment of the present invention.

In various embodiments, the functions of the present invention are performed on separate nodes. In one embodiment shown in FIG. 2, a packet is received from a sender 301 at one 302 of a plurality of receiving nodes 302,307 and 308. Node 302 then applies a rule and refers the packet to a load balancing proxy. The load balancing proxy can perform its analysis at a separate node 305 that can advantageously function as a central load balancing coordinator. The central load balancing coordinator 305 sends a load balancing rule to node 302 that instructs the firewall at node to route packets to the destination server selected by the coordinator 300 to balance load. Node 302 then implements the load balancing rule. This further illustrates the advantageous scalability of the present invention. Only relatively few coordinator sites (in relation to the number of receiving nodes) are needed to perform load balancing analysis and determine load balancing rules.

Figure 3:
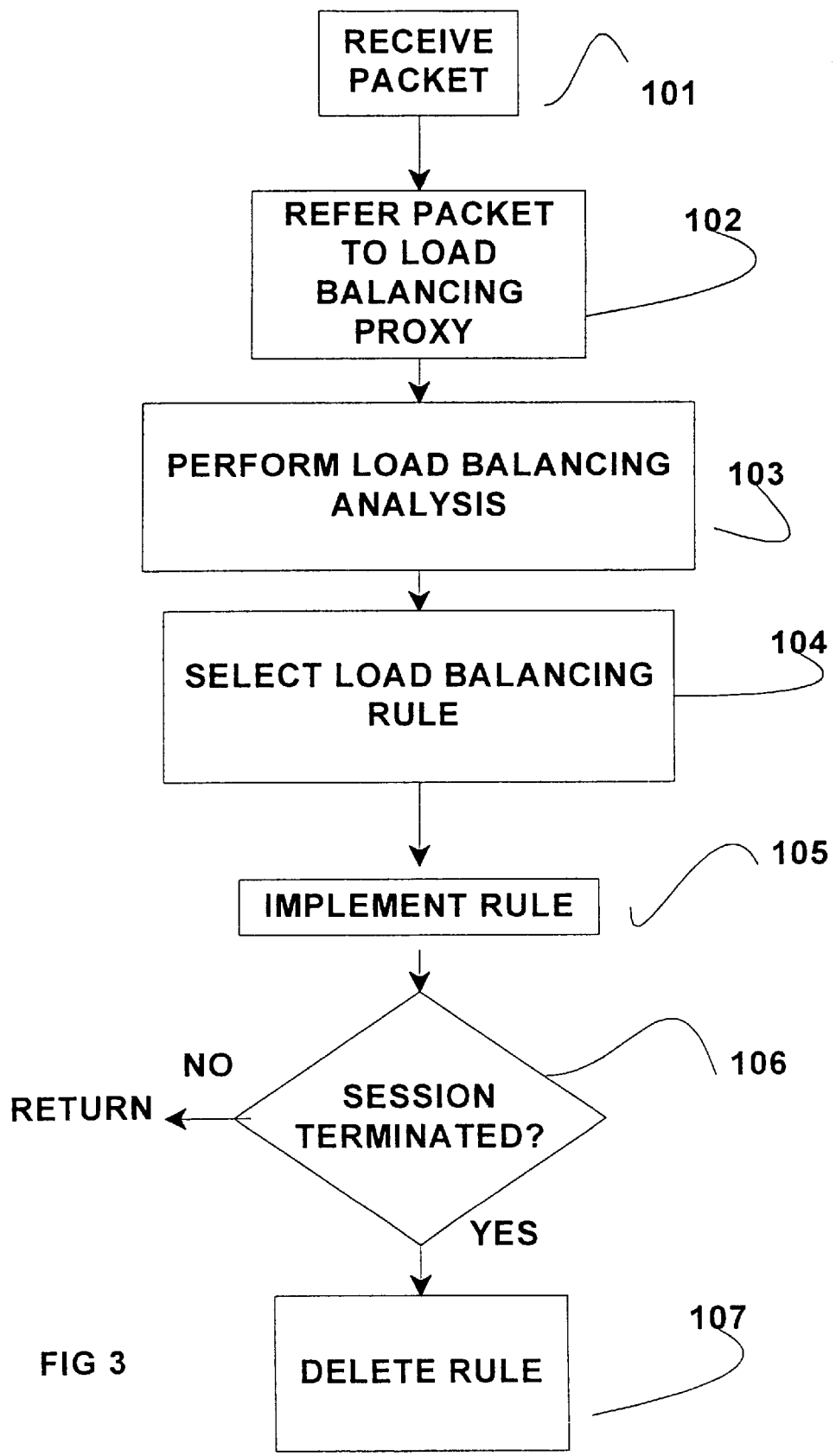
FIG. 3 is a flow chart illustrating the method in accordance with one embodiment of the present invention.

A flow chart showing the method in accordance with an embodiment of the present invention is shown in FIG. 3. A packet is received at a firewall, step 101. A rule is applied by the firewall to the packet that refers the packet to a load balancing proxy, step 102. In one embodiment, the load balancing proxy performs a load balancing analysis, step 103, based upon the intended destination (i.e., the destination address) of the packet. The load balancing proxy determines a load balancing rule based upon the load balancing analysis performed, step 104. The load balancing rule is implemented by the firewall, step 105. In one embodiment, when the session to which the received packet belonged is terminated, the rule is deleted, thereby advantageously saving memory resources. Thus, it is determined if the session is terminated, step 106. If it is terminated, then the load balancing rule is deleted, step 107.

In one embodiment of the present invention, a load balancing analysis is performed by the load balancing proxy on only the first packet of a message. The appropriately load balancing rule is constructed, and then loaded into the firewall. Subsequent packets in the message are then filtered in accordance with the rule constructed for the first packet of the message. The speed of the load balancing performed by an embodiment of the present invention is thereby increased over known systems, because the load balancing is performed at the kernel level using firewall rules, rather than at the slower application level. Functions performed by the kernel are faster because they are performed at a more elemental level (the operating system)than functions performed at the application level. Functions performed at the application layer utilize the kernel and other software to execute.

An embodiment of the present invention is not only faster, but is also more flexible than known systems. The load balancing proxy can advantageously quickly dynamically change the rules used for load balancing by the firewall in response to changing load conditions at the servers to which message traffic is directed. For example, a load balancing proxy can change the firewall rule that directs a message (or session) to a particular server midstream, i.e., at any point after the beginning of the message or session and before the end, if this can be handled without interrupting the service provided by the servers being balanced. This can be done several times per message or session in accordance with an embodiment of the present invention.

One method in accordance with an embodiment of the present invention for dynamically changing a load balancing rule includes sending a packet received at the firewall to the load balancing proxy. The load balancing proxy constructs a load balancing rule X based upon the packet, and loads it at the firewall. The load balancing rule X directs that packets with equivalent characteristics (e.g., similar header parameters) to the packet referred to the load balancing proxy be directed to Server A. After a number of these packets are received and processed by Server A, Server A then becomes congested (heavily loaded), and sends a message to the firewall to either generally reduce the amount of traffic being directed to Server A, or else specifically to redirect the traffic being sent in accordance with load balancing rule X to another server. The load balancing proxy then determines a new rule Y, based in one embodiment upon a determination by the proxy of the server best able to handle the traffic. Rule Y directs the traffic directed by rule X to another server, Server B. Rule Y is then loaded at the firewall, and the traffic formerly directed to Server A is now directed to Server B.

In one embodiment, the load balancing proxy uses information contained in several packets to determine a load balancing rule. In other words, the information needed to make a load balancing determination is spread over several packets, all of which the load balancing proxy considers in determining the appropriate load balancing rule. Once the several packets are analyzed, the load balancing proxy determines the rule, and it is loaded at the firewall. The rule then directs subsequent packets to the appropriate server.

A medium that stores instructions adapted to be executed on a processor, like memory 205, is meant to encompass any medium capable of storing digital information. Examples of a medium that stores instructions include a hard disk, a floppy disk, a Compact Disk Read Only Memory (CD-ROM), magnetic tape, flash memory, etc.

The term "instructions adapted to be executed" is meant to encompass more than machine code. The term "instructions adapted to be executed" is meant to encompass source code, assembler, and any other expression of instructions that may require preprocessing in order to be executed by processor. For example, also included is code that has been compressed or encrypted, and must be uncompressed and/or unencrypted in order to be executed by a processor.

The present invention advantageously provides a more efficient system and method for load balancing that is advantageously transparent to the sender and recipient of packets.

What is claimed is:

1. A method for load balancing, including the steps of:
    a. receiving a packet at a firewall;
    b. implementing a rule with respect to the packet that refers the packet to a load balancing proxy;
    c. performing a load balancing analysis at the load balancing proxy;
    d. determining a load balancing rule based upon the load balancing analysis of step c; and
    e. implementing the load balancing rule at the firewall.

2. The method of claim 1, wherein the received packet has a source address, source port, destination address, destination port and protocol number.

3. The method of claim 1, further comprising the step of performing a PASS action or a DROP action with respect to a packet received at the firewall.

4. The method of claim 1, further including the steps of determining if a session is terminated, and if the session is terminated, then deleting the load balancing rule at the firewall.

5. An apparatus for load balancing, comprising:
    a. a processor;
    b. a memory that stores a rule and load balancing instructions adapted to be executed by said processor to receive a packet at a firewall, implementing a rule with respect to the packet that refers the packet to a load balancing proxy, perform a load balancing analysis at the load balancing proxy, determine a load balancing rule based upon the load balancing analysis, and implement the load balancing rule at the firewall, said memory coupled to said processor;
    c. a first port adapted to be coupled to the sender of the packet, said first port coupled to said processor; and
    d. a second port adapted to be coupled to the destination to which the packet is addressed, said second port coupled to said processor.

6. The apparatus of claim 5, wherein said load balancing instructions are further adapted to be executed by said processor to detect if a session is terminated and to delete a load balancing rule.

7. A medium that stores instructions adapted to be executed by a processor to perform steps including:
    a. receiving a packet at a firewall;
    b. implementing a rule with respect to the packet that refers the packet to a load balancing proxy;
    c. performing a load balancing analysis at the load balancing proxy;
    d. determining a load balancing rule based upon the load balancing analysis of step c; and
    e. implementing the load balancing rule at the firewall.

8. The medium of claim 7, wherein said instructions are further adapted to be executed by a processor to perform the step of determining that a session is terminated and deleting a load balancing rule at the firewall.

9. A system for filtering a packet that is part of a session between applications. that negotiate a connection parameter, including the steps of:
    a. means for receiving a packet at a firewall;
    b. means for implementing a rule with respect to the packet that refers the packet to a load balancing proxy;
    c. means for performing a load balancing analysis at the load balancing proxy;
    d. means for determining a load balancing rule based upon the load balancing analysis of step c; and
    e. means for implementing the load balancing rule at the firewall.

10. The system of claim 9, further comprising means for detecting if a session is terminated and means for deleting a rule.

* * * * *